(12) United States Patent
Asher

(10) Patent No.: US 8,095,729 B2
(45) Date of Patent: *Jan. 10, 2012

(54) DISK DRIVE ARRAY SYNCHRONIZATION VIA SHORT-RANGE RF SIGNALING

(75) Inventor: Michael Asher, Green Cove Springs, FL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 317 days.

This patent is subject to a terminal disclaimer.

(21) Appl. No.: 12/341,435

(22) Filed: Dec. 22, 2008

(65) Prior Publication Data

US 2010/0161899 A1 Jun. 24, 2010

(51) Int. Cl.
*G06F 12/00* (2006.01)

(52) U.S. Cl. ....... 711/114; 711/112; 360/70; 360/73.02; 360/75

(58) Field of Classification Search .................. 711/112, 711/114; 360/70, 73.02, 75

See application file for complete search history.

(56) References Cited

U.S. PATENT DOCUMENTS

| | | | |
|---|---|---|---|
| 4,870,643 A | 9/1989 | Bultman et al. | |
| 4,907,105 A | 3/1990 | Kurzweil, Jr. | |
| 4,918,544 A | 4/1990 | Ishizuka et al. | |
| 5,159,503 A | 10/1992 | Mitamura et al. | |
| 5,216,654 A | 6/1993 | Itoh et al. | |
| 5,237,466 A | 8/1993 | Glaser et al. | |
| 5,249,254 A | 9/1993 | Murphy et al. | |
| 5,303,097 A | 4/1994 | Baba et al. | |
| 5,491,593 A | 2/1996 | Donaldson | |
| 5,796,540 A | 8/1998 | Jones et al. | |
| 5,841,604 A | 11/1998 | Supino | |
| 5,877,913 A | 3/1999 | Shitara | |
| 5,999,357 A | 12/1999 | Serrano | |
| 6,012,124 A | 1/2000 | Kamo et al. | |
| 6,118,612 A | 9/2000 | Judd et al. | |
| 6,134,068 A * | 10/2000 | Donaldson | 360/73.02 |
| 6,603,625 B1 * | 8/2003 | Hospodor et al. | 360/73.02 |
| 7,111,192 B2 | 9/2006 | Iguchi | |
| 2003/0229758 A1 | 12/2003 | Kawamoto | |
| 2004/0107313 A1 | 6/2004 | Kamo et al. | |
| 2005/0132154 A1* | 6/2005 | Rao et al. | 711/162 |
| 2005/0250533 A1* | 11/2005 | El-Batal et al. | 455/552.1 |
| 2008/0256291 A1 | 10/2008 | Asher | |

OTHER PUBLICATIONS

Asada et al. "Reduced Cable Smart Motors Communicating Over the DC Power Bus-Line", Progress Report No. 3-3, Oct. 1, 2001-Mar. 31, 2002, MIT Home Automation and Healtchare Consortium, pp. 1-19.

* cited by examiner

*Primary Examiner* — Shane M Thomas

(74) *Attorney, Agent, or Firm* — Parks IP Law LLC; Jennifer P. Medlin, Esq.

(57) ABSTRACT

A plurality of disk drives in a disk drive array are synchronized. A synchronization signal is generated at a master disk drive. The synchronization signal is encoded as a radio frequency signal for transmission over a radio frequency network in communication with the plurality of disk drives. The transmitted radio frequency signal is received at a slave disk drive and decoded to recover the synchronization signal. Rotation of a disk in the slave disk drive is synchronized with rotation of a disk in the master disk drive based on the recovered synchronization signal.

19 Claims, 3 Drawing Sheets

DISK DRIVE ARRAY SYNCHRONIZATION VIA SHORT-RANGE RF SIGNALING

BACKGROUND

Exemplary embodiments relate to disk drive synchronization and, more particularly, to disk drive array synchronization via short range RF signaling.

Modern computer systems require greater amounts of memory and storage capabilities. As the typical storage needs in a file server exceed the capacity of hard disks, most file servers require multilevel disks to provide the necessary storage capacity. A disk drive storage configuration often used to provide the necessary storage capacity is a Redundant Array of Independent Drives (RAID). In a RAID configuration, a single logical storage device is formed out of multiple physical devices (typically, hard disk drives). Such arrays are the industry-standard architecture for enterprise storage and retrieval of online data.

There are a large number of differing RAID techniques (known as "levels") with varying design goals and performance profiles. Some of the most common are RAID levels 1, 5, 10, and 0+1. In all the above cases, a single block of data is distributed across multiple physical drives. The failure of any single disk causes no data loss due to redundant storage.

In order to increase performance, data may be written to multiple disks drives roughly simultaneously. However, as disks in different drives ten to be in different relative rotational positions, the latency before accessing data may be different for each drive.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to an exemplary embodiment a data storage system includes a plurality of disk drives. Each disk drive is in communication with a radio frequency network. At least one of the disk drives serves as a master disk drive, and at least one of the disk drives serves as a slave disk drive. The master disk drive generates a synchronization signal based on a rotational position of at least one disk within the master disk drive, and encodes the synchronization signal as a radio frequency signal for transmission over the radio frequency network. The slave disk drive receives the radio frequency signal, decodes the received radio frequency signal to recover the synchronization signal, and modifies a rotational position of at least one disk within the slave disk drive based on the recovered synchronization signal.

According to another embodiment, a method of synchronizing a plurality of disk drives is provided. A synchronization signal is generated at a master disk drive. The synchronization signal is encoded as a radio frequency signal, and the radio frequency signal is transmitted to at least one slave disk drive. The transmitted radio frequency signal is received at the slave disk drive and decoded to recover the synchronization signal. Rotation of at least one disk in the slave disk drive is synchronized with rotation of at least one disk in the master disk drive based on the recovered synchronization signal.

According to another embodiment, redundant array of independent disks (RAID) is synchronized. A radio frequency network is coupled to a master disk drive in the array. The master disk drive transmits a synchronization signal over the radio frequency distribution network. At least one slave disk drive in the array is coupled to the radio frequency distribution network. The slave disk drive receives the synchronization signal from the radio frequency network and synchronizes rotation of at least one disk based on the received synchronization signal.

Other methods, computer program products, and/or systems according to various embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
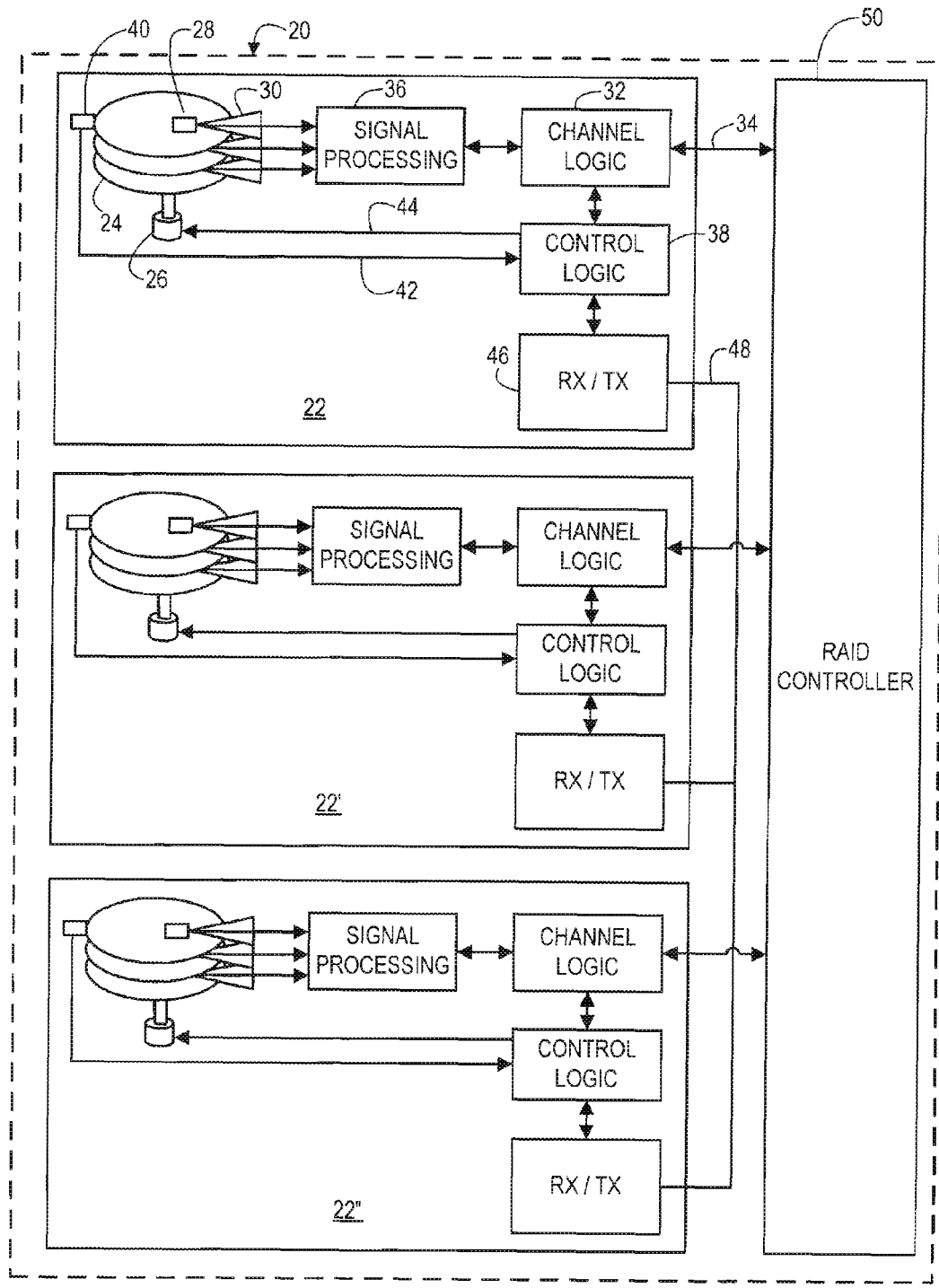
FIG. 1 is a block diagram illustrating a disk array according to an embodiment.

Exemplary embodiments will be described more fully hereinafter with reference to the accompanying figures, in which embodiments are shown. The embodiments described herein, however, be implemented in many alternate forms and should not be construed as limited to descriptions set forth herein.

Exemplary embodiments are described below with reference to block diagrams and/or flowchart illustrations of methods, apparatus (systems and/or devices) which may include computer program products. It should be understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, portions exemplary embodiments may be implemented in hardware and/or in software (including firmware, resident software, micro-code, etc.) that run on a processor such as a digital signal processor, collectively referred to as "circuitry" or "a circuit". Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate or transport the program for use by or in connection with the instruction execution system, apparatus, or device.

The computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Referring now to FIG. 1, a block diagram illustrating a disk array 20 according to an embodiment is shown. The dashed line in FIG. 1 represents a metal enclosure in which the disk array 20 may be contained. The disk array may include a plurality of disk drives, e.g., disk drives 22, 22', and 22" (collectively referred to at various places herein as disk drives 22). For simplicity of illustration, reference numerals pointing to various components in disk drives 22' and 22" that are the same as components in disk drive 22 are omitted.

Each of the disk drives 22 may conform to any standard for disk drives, including various standards for SCSI, SAS, ATA, SATA, Fibre Channel, ESCON, FICON, ESDI, IDE, and the like. Each of the disk drives 22 includes one or more disks 24 rotated by a motor 26. Each disk 24 is accessed by at least one read/write head 28 which is moved across the disk 24 by an arm 30.

During a write operation, data is received by channel logic 32 in the disk drive 22 over a channel interconnect 34. The channel logic 32 separates command information from data and may further process the received data for writing. This processing may include, for example, dividing the data between multiple disks 24 within the drive 22, adding error correction and/or detection information, encoding, and encrypting. A signal processor 36 may include circuitry and/or logic for converting, filtering, pulse shaping, amplifying, and other analog processing to generate write signals for a read/write head 28. A read operation basically reverses the operations performed by a write operation. The read/write head 28 generates read signals for signal processor which may perform various operations including, for example, amplifying, filtering, detecting, and converting to generate a digital signal for channel logic 32. Channel logic 32 may further process the data, including, for example, decrypting, decoding, error correction, error detection, and combining data from different disks 24. The resulting data may be sent on a channel interconnect 34. to a RAID controller 50.

Each of the disk drives 22 includes control logic, referenced generally with reference numeral 38, which controls, among other things, the rotational speed of disks 24. A sensor 40 produces a position signal 42 by sensing the rotational position of disk 24 such as, for example, by generating a once-per-rotation pulse based on measuring a magnetic, optical, or mechanical variation on disk 24. The control logic 38 uses the position signal 42 to set and/or maintain the rotational speed of the disks 24 by providing a motor control signal 44 to the motor 26. Motor speed may be controlled, for example, by a phase-locked loop in control logic 38, as those skilled in the art will appreciate. Various other rotational position sensing techniques may be used as an alternative to, or in addition with, the sensor 40, including, e.g., sensing markings on a disk 24 with the read/write head 28, and using feedback from the motor 26.

Although not shown for simplicity of illustration, each of the disk drives 22 may include power distribution circuitry for receiving power from, e.g., the RAID controller 50 and distributing the power to components within the disk drives 22.

The RAID controller 50 sends read and write commands to each of the disk drives 22 over channel interconnects 34. The RAID controller 50 also divides blocks of data for storage on the disk drives 22 and aggregates data retrieved from the disk drives 22. The RAID controller 50 determines which RAID level is implemented and how data is to be distributed between disk drives 22. The RAID controller 50 may also include power regulation circuitry for supplying power to the disk drives 22.

The distributed nature of the disk drive array 20 works to increase data transfer bandwidth. For example, the aggregate bandwidth of a logical array is the sum of the bandwidths of each device (minus losses due to overhead, such as parity). This increase in bandwidth works to increase the performance of the disk drive array 20. However, there is another factor which reduces array performance, sometimes to below that of a single drive.

Every disk drive has a certain rotational latency associated with any read or write request. This latency is the time required for the platter (or disk) to rotate the appropriate sector underneath the fixed read/write head. The mean latency $L_{rot}$, is an inverse function of the platter angular velocity $\omega$ (the rotational speed) as expressed in Equation (1):

$$L_{rot} = \tfrac{1}{2}[2\pi/\omega] = \tfrac{1}{2}f^{-1} \qquad (1)$$

where f is the rotational frequency of disk 24 in rev/sec.

The mean rotational latency of an array, however, is higher. To read any single block, all disks 24 must reach a given point in their angular rotation. Since unsynchronized disks 24 rotate at slightly different velocities, the value of the expectation latency $L_{rotarray}$, for n drives is the sum of a series as expressed in Equation (2)

$$L_{rotarray} = [\Sigma_{k=1,n} 2^{-k}] f^{-1} \qquad (2)$$

where n is the array width, otherwise referred to as the number of disk drives in the array.

The number of drives n in Equation (2) is the total number of drives used in a write operation. In some systems, the effective number of disk drives for a read operation does not include drives used to store parity information. To see the effect of Equation (2), consider the write latency in a disk array system with five disk drives, as expressed in Equation (3):

$$[½+¼+⅛+1/16+1/32]=0.968 L_{max} \quad (3)$$

where $L_{max}$ is the maximum latency for a single disk. The resulting expected latency in this example is nearly double the expected rotational latency of a single disk. This increased latency offsets the bandwidth increase of the array. In particular, a disk array which sees a high volume of very small I/O requests can expect to experience extreme performance degradation.

In an effort to account for this latency, according to exemplary embodiments, array rotation synchronization is accomplished via a clock signal sent as a radio frequency signal from a master drive (e.g., disk drive 22) in the array 20 of disk drives. The slave disk drives (e.g., 22', 22") receiving the signal uses it to synchronize rotation precisely. Once synchronization is complete (which should take only a few milliseconds for current 10K or 15K rpm Small Computer System Interface (SCSI) drives), the rotational latency of the array 20 will drop to the value of a single drive.

In one embodiment, the master disk drive is designated manually, such as, for example, via a jumper setting on the drive itself. In alternate embodiments, all drives are initially configured identically, and when the drives are first powered on, the drives agree upon one drive to act as master. This agreement may be reached, for example, via any standard leader election distributed algorithm. In a SCSI environment, the well known LCR (Le Lann, Chang, Roberts) algorithm, with ring position set by SCSI ID, may be used. As will be recognized by one of ordinary skill in the art, many other implementations are equally feasible.

Once a master disk drive is established, the master drive generates, e.g., a periodic clock signal, the period of which is tied to the rotational speed of the drive. In one embodiment, this is done by generating one pulse per platter rotation, as the read head passes over the first sector on a platter track. However, the exact timing is irrelevant, as long as the signal period corresponds to some integral fraction of the rotational speed, and as long as all drives agree on which sector constitutes the sector start signal. In some implementations, the signal may be derived from a clock signal already present within the design and used to stabilize the rotational period. Such clock signals may be found, for example, in a phase-locked loop used for controlling motor speed. Other synchronization signals may also be used, e.g., a differential signal.

According to an exemplary embodiment, the clock signal may be encoded as a short range radio frequency signal (e.g., analog or digital pulse). In one embodiment, the clock signal may be encoded according to the Bluetooth short-range radio frequency signal standard, described, for example, in the Bluetooth Specification, Version 2.0+EDR, Nov. 10, 2004 and Version 2.1+EDR, Jul. 26, 2007. However, the clock signal may be encoded into other short-range RF signals. If leader-election is being performed automatically to select the master disk drive, the encoding scheme may also include a robust protocol to ensure error-free communication.

Once encoded as an RF signal, the synchronization pulses are transmitted via a transceiver 46 from the master drive to all other disk drives within the array. The transceiver may include an omnidirectional antenna. As an alternative, a metal enclosure of the disk drive may function as an antenna. The slave disk drives, in turn, receive the synchronization pulses sent over a radio link 48. As the disk drives are enclosed within the same metal RAID cabinet (represented by the dashed line in FIG. 1), faraday shielding issues is not a concern.

Figure 2:
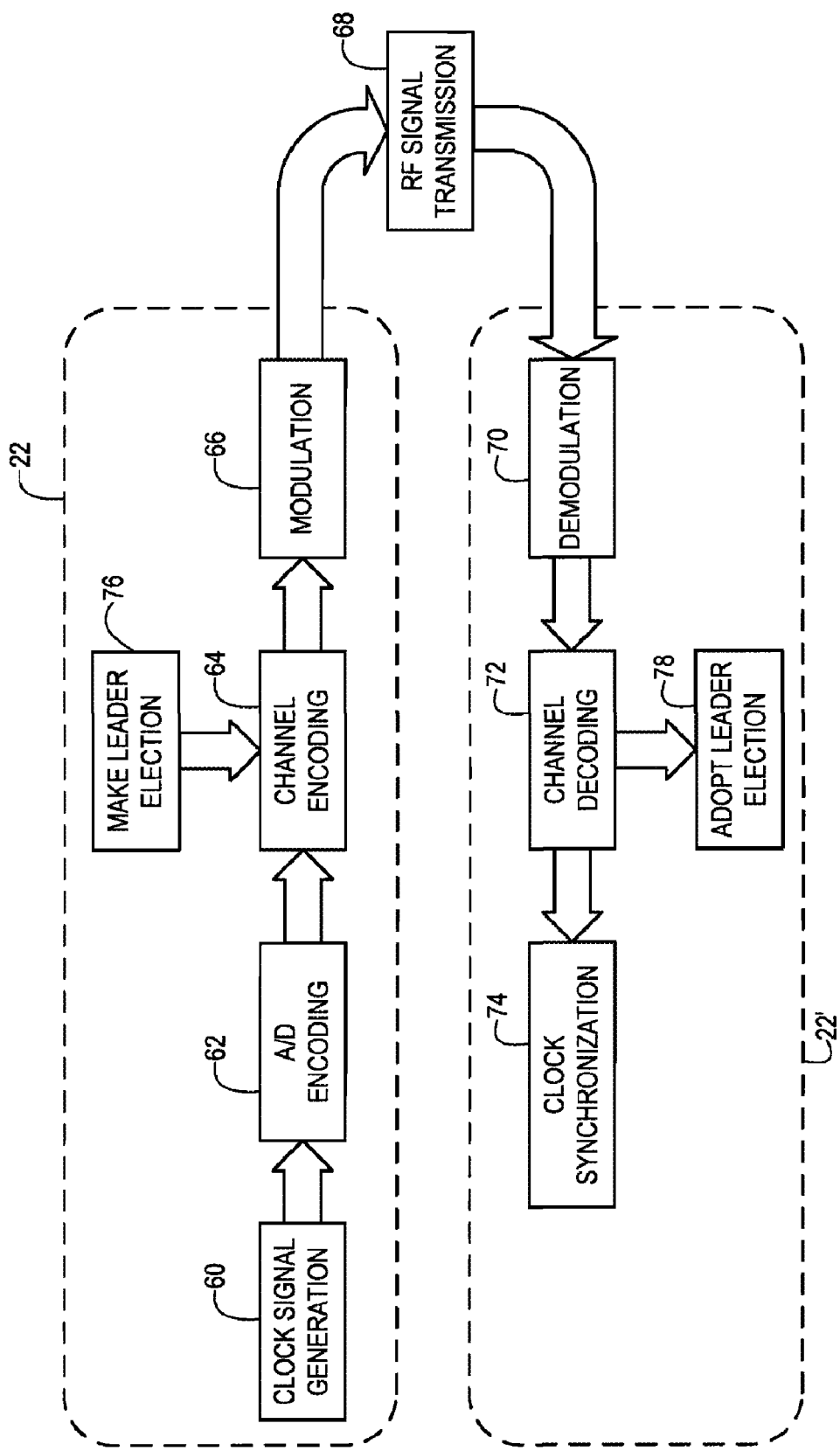
FIG. 2 is a flow diagram illustrating disk drive synchronization according to an embodiment.

Referring now to FIG. 2, a flow diagram illustrating synchronization according to an embodiment is shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed.

FIG. 2 illustrates a flow diagram showing synchronization between a master disk drive 22 and a slave disk drive 22'. Although not illustrated in the interest of clarity, it should be appreciated that synchronization between the master disk drive 22 and other slave disk drives may be performed at the same time and in the same manner as synchronization between the disk drives 22 and 22' depicted in FIG. 2.

In the master disk drive 22, a clock signal is generated, as in block 60. The clock signal may be generated by reading a location at a fixed point on the disk, by sensing the disk rotation, by feeding back motor information, or the like. The clock signal may also be generated as part of the speed control for the disk drive such as, for example, as part of a phase-locked loop. Optionally, this clock signal may be converted to a digital signal, as in block 62.

The clock signal is channel encoded, e.g., in channel logic 32, as in block 64. The method of encoding may depend upon the mode chosen for leader-election. If the master disk drive is manually configured, then little communication functionality is required, and encoding may include a simple conversion of the clock signal to a protocol, such as the Bluetooth standard protocol. If the master disk drive is automatically configured, then a more complex digital encoding scheme may be used, along with a robust protocol to ensure error-free communication. In the embodiment shown, channel encoding may include the process of encoding a raw digital bit stream into a form suitable for robust communication. This may include one or more of the addition of framing or control bits, the use of redundant information to allow for error recovery, data compression, and the like.

The synchronization signal is modulated, as in block 66. Modulation may include the process of converting a bit stream to a short range RF signal capable of being transmitted via an omnidirectional antenna to the other disk drives. This may be accomplished by the mapping of particular bit sequences to waveforms. An example of a modulation scheme used according to the Bluetooth standard is Gaussian Frequency Shift Keying (GFSK). However, other modulation schemes may be used. The modulated synchronization signal is transmitted from master disk drive 22 to at least one slave disk drive 22' via, e.g., the radio frequency radio link 48, as in block 68.

The synchronization signal is demodulated in at least one slave disk drive 22', as in block 70. Demodulation recovers the baseband data and/or timing information from the RF signal. Channel decoding is performed, as in block 72. Decoding is done via the corresponding inverse to the encoding process. Once the clock signal is decoded, each slave drive uses the decoded signal to synchronize disk rotation with that of the master, as in block 74. This may be done, for example, by tuning the rotational speed via Pulse Width Modulation (PWM), spindle motor driving voltage variance, or other well-known technique, until the received clock pulses synchronizes exactly with the start sector of each rotational period. For maximum accuracy, synchronization should account for any latency in the encoding/decoding process. For example, a 15K RPM drive completes one rotation each 66 µsec. If encoding/decoding latency averages 6 µsec, then slave drives may defer synchronization lock for an additional platter rotation of 2·π/11 radians.

Information for establishing which disk drive will function as master and which drive(s) will function as slave(s) may be transmitted via the RAID controller 50 and connections 34 to the disk drives 22. For example, referring to FIG. 2, master disk drive 22 may make the leader election, as in block 76. This election may be based on a manual setting, such as a jumper, or may be made automatically by disk drives 22, 22'. The election decision is encoded, as in block 64, modulated, as in block 66, and transmitted over channel connection links 34 via the RAID controller 50, as in block 68. Slave disk drive 22' receives the transmitted decision, demodulates the decision, as in block 70, decodes the decision, as in block 72, and adopts the decision, as in block 78. In embodiments where multiple disk drives participate in making the leader election, these disk drives will have functionality to encode and decode as well as to modulate and demodulate.

Figure 3:
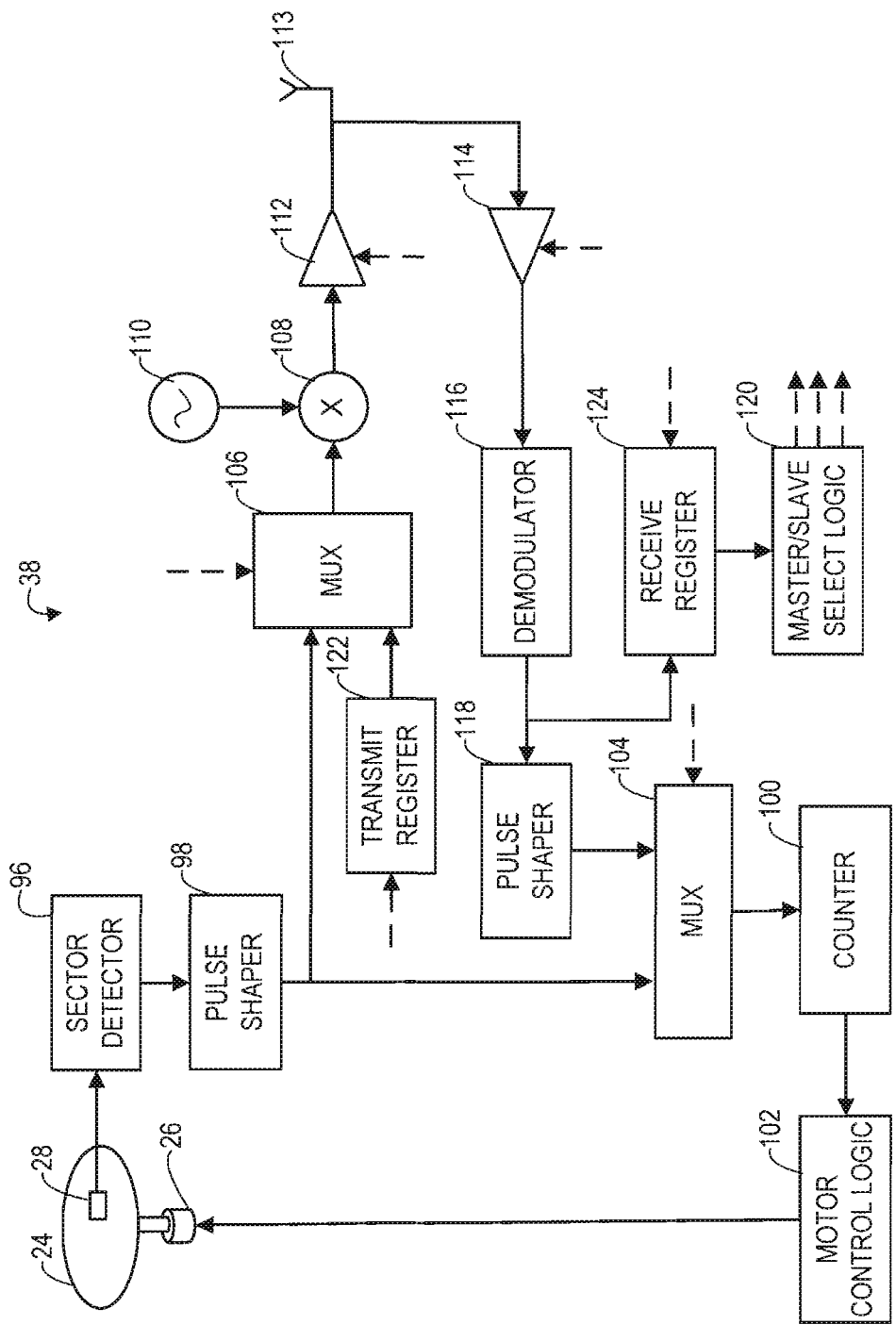
FIG. 3 is a schematic diagram illustrating in detail radio frequency components and control logic according to an embodiment.

Referring now to FIG. 3, a conceptualized schematic diagram illustrating power distribution circuitry and control logic according to an embodiment is shown. During operation of the disk drive 22, the read/write head 28 reads magnetic markings on the disk 24. Sector detector logic 96 detects when the read/write head 28 accesses a particular portion of the disk 24 such as, for example, at the start of a particular sector on each track of the disk 24. A pulse shaper 98 generates a pulse of a particular width when triggered by the output of the sector detector 96. The pulse generated by pulse shaper 98 can be used to trigger one or more functions of a counter 100 such as, for example, to load a value, reset, begin counting clock pulses, and stop counting clock pulses. The counter 100 is used by motor control logic 102 to control the speed of motor 26 spinning disk 24. Various motor control algorithms and techniques are known in the art, and any of these techniques may be used. For example, the value in counter 100 at a particular instant of time may be used to set the width of a pulse provided to motor 26 for pulse width modulation control.

If disk drive 22 is set to function as a master disk drive, a multiplexer 104 routes the output of pulse shaper 98 to counter 100, and a multiplexer 106 routes the output of pulse shaper 98 to modulator 108, represented as a multiplication process multiplying the generated pulse by a high frequency carrier generated by an oscillator 110. A transmit amplifier 112 amplifies the modulated signal for transmission via an omnidirectional antenna 113 and the radio link 48 (shown in FIG. 1).

If the disk drive 22 is set to function as a slave disk drive, a receive amplifier 114 amplifies a modulated signal received via the omnidirectional antenna 113 and the radio frequency link 48. The demodulator 116 demodulates the received signal. The pulse shaper 118 uses the demodulated signal to generate a pulse which is routed through the multiplexer 104 for controlling the counter 100.

Master/slave select logic 120 generates control signals (shown as dashed lines) for determining whether the disk drive 22 will function as a master disk drive or a slave disk drive. These control signals provide select functions for multiplexers 104, 106 and provide enabling signals for amplifiers 112, 114. If the disk drive 22 participates in automatically determining master/slave status, master/slave select logic 120 also interfaces with transmit register 122 and receive register 124. Messages from other disk drives may be received through channel interconnects 34 and amplifier 114, are demodulated by demodulator 116, and shifted bitwise into a receive register 124, where the data is used by master/slave select logic 120. When it is time for the disk drive 22 to transmit, master/slave select logic 120 loads the transmit register 122 with data (through a connection not shown for clarity). The data is then shifted bitwise through the multiplexer 106, modulated by the modulator 108, amplified by the amplifier 112, and transmitted via, e.g., the channel interconnects 34 as shown in FIG. 1.

If the disk drive 22 is manually configured as either a master disk drive or a slave disk drive, the multiplexer 106, the transmit register 122, and the receive register 124 may not be needed. In this case, master/slave select logic reads the state of a jumper (not shown for clarity) to determine whether or not disk drive the 22 will function as a master disk drive or a slave disk drive, and generates control signals appropriately.

The various embodiments disclosed provide increases in performance even if some, but not all, of the disk drives in the array support rotational synchronization. According to exemplary embodiments, the synchronization technique described herein is applicable to read and write performance for at least RAID levels 5, 6, 0+1, 10, and for write performance for RAID level 1. This technique may provide substantial gains with only minor modifications to existing drives, and no modifications to RAID controllers, enclosures, cabling and/or software.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed exemplary embodiments and, although specific terms are employed, they are used in a generic and descriptive sense only and not for purposes of limitation.

What is claimed is:
1. A data storage system comprising:
a plurality of disk drives, each disk drive in the plurality of disk drives in communication with a radio frequency network, at least one of the plurality of disk drives serving as a master disk drive and at least one of the plurality of disk drives serving as a slave disk drive;
wherein the at least one master disk drive generates a synchronization signal based on a rotational position of at least one disk within the at least one master disk drive and encodes the synchronization signal as a radio frequency signal for transmission over the radio frequency network;
wherein the at least one slave disk drive receives the radio frequency signal, decodes the received radio frequency signal to recover the synchronization signal, and modifies a rotational position of at least one disk within the at least one slave disk drive based on the recovered synchronization; and
wherein the synchronization signal accounts for latency in rotation of the plurality of disk drives and latency in encoding and decoding the synchronization signal.
2. The data storage system of claim 1, wherein more than one of the plurality of disk drives is operative to function as the at least one master disk drive.

3. The data storage system of claim 2, wherein the more than one of the plurality of disk drives operative to function as the at least one master disk drive automatically select one disk drive to function as a sole master disk drive.

4. The data storage system of claim 2, further comprising selection logic for selecting one disk drive to function as a sole master disk drive.

5. The data storage system of claim 2, wherein the master disk drive is selected using a distributed leader election algorithm.

6. The data storage system of claim 1, wherein one master disk drive is selected by manually configuring one of the plurality of disk drives operative to function as a sole master disk drive.

7. The data storage system of claim 1, wherein the radio frequency network includes at least one transceiver and at least one omnidirectional antenna connected to at least one disk drive for transmitting and receiving radio frequency signals.

8. The data storage system of claim 1, wherein the radio frequency network includes at least one transceiver and a metal enclosure of at least one disk drive for transmitting and receiving radio frequency signals.

9. The data storage system of claim 1, wherein the radio frequency signal is transmitted as a short range frequency signal.

10. A method of synchronizing a plurality of disk drives, comprising:
generating a synchronization signal at a master disk drive in the plurality of disk drives;
encoding the synchronization signal as a radio frequency signal;
transmitting the radio frequency signal from the master disk drive;
receiving the transmitted radio frequency signal at a slave disk drive in the plurality of disk drives;
decoding the received radio frequency signal to recover the synchronization signal; and
synchronizing rotation of at least one disk in the slave disk drive with rotation of at least one disk in the master disk drive based on the recovered synchronization signal, wherein the synchronization signal accounts for latency in rotation of the plurality of disk drives and latency in encoding and decoding the synchronization signal.

11. The method of claim 10, wherein more than one of the plurality of disk drives is operative to function as the master disk drive.

12. The method of claim 11, wherein one of the plurality of disk drives operative to function as the master disk drive is manually set to function as the master disk drive.

13. The method of claim 11, wherein the plurality of disk drives operative to function as the master disk drive automatically determine which disk drive will function as the master disk drive.

14. The method of claim 11, wherein the master disk drive is determined using a distributed leader election algorithm.

15. The method of claim 10, wherein the radio frequency signal is transmitted as a short range radio frequency signal.

16. A redundant array of independent disks (RAID), comprising:
a radio frequency network;
a master disk drive coupled to the radio frequency distribution network, the master disk drive transmitting a synchronization signal over the radio frequency network; and
at least one slave disk drive coupled to the radio frequency network, the slave disk drive receiving the synchronization signal from the radio frequency network and synchronizing rotation of at least one disk with rotation of at least one disk in the master disk drive based on the received synchronization signal, wherein the synchronization signal accounts for latency in rotation of the plurality of disk drives and latency in encoding and decoding the synchronization signal.

17. The system of claim 16, wherein the master disk drive is determined by manually configuring one of a plurality of disk drives in the array.

18. The system of claim 16, wherein the master disk drive is determined by negotiation amongst a plurality of disk drives in the array.

19. The system of claim 16, wherein the synchronization signal is transmitted as a short range radio frequency signal.

* * * * *